United States Patent [19]

Kammuri et al.

[11] Patent Number: 4,900,571
[45] Date of Patent: Feb. 13, 1990

[54] PROCESS FOR PRODUCING A SHARK FIN ANALOG

[75] Inventors: Youichi Kammuri, Tokyo; Eizoh Nagahisa, Sagamihara; Sumio Kamikawa, Tokyo, all of Japan

[73] Assignee: Nippon Suisan Kabushiki Kaisha, Tokyo, Japan

[21] Appl. No.: 204,970

[22] Filed: Jun. 8, 1988

Related U.S. Application Data

[63] Continuation of Ser. No. 918,657, Oct. 14, 1986, abandoned, which is a continuation of Ser. No. 814,180, Dec. 24, 1985, abandoned, which is a continuation of Ser. No. 571,529, Jan. 17, 1984, abandoned.

[30] Foreign Application Priority Data

Jan. 28, 1983 [JP] Japan ..................... 58-12243

[51] Int. Cl.$^4$ .................. A23J 3/00; A23L 1/325; A23P 1/12
[52] U.S. Cl. ..................... 426/276; 264/202; 426/574; 426/576; 426/656; 426/657; 426/802
[58] Field of Search ............ 426/104, 276, 574, 576, 426/656, 657, 516, 575, 802; 264/183, 202, 215

[56] References Cited

U.S. PATENT DOCUMENTS

| | | | |
|---|---|---|---|
| 1,590,999 | 6/1926 | Czapek et al. | 264/215 |
| 2,340,909 | 2/1944 | Traill et al. | 264/202 |
| 2,374,201 | 4/1945 | Highberger et al. | 264/202 X |
| 3,093,483 | 6/1963 | Ishler et al. | 426/802 X |
| 3,455,697 | 7/1969 | Atkinson | 426/802 X |
| 3,645,746 | 2/1972 | Atkinson | 426/802 X |
| 3,891,776 | 6/1975 | Carpenter et al. | 426/276 X |
| 4,018,903 | 4/1977 | Segeren et al. | 426/802 X |
| 4,251,547 | 2/1981 | Liggett | 426/276 X |
| 4,328,252 | 5/1982 | Murray et al. | 426/802 X |
| 4,362,748 | 12/1982 | Cox | 426/276 X |
| 4,371,560 | 2/1983 | Hochhauser et al. | 426/802 X |
| 4,396,634 | 8/1983 | Shenouda et al. | 426/802 X |
| 4,423,083 | 12/1983 | Shenouda | 426/574 |

Primary Examiner—Arthur L. Corbin
Attorney, Agent, or Firm—Wenderoth, Lind & Ponack

[57] ABSTRACT

A shark fin analog utilized as a food is produced by heating to dissolve a mixture of gelatin, alginic acid or an alginate or a mannan, and water to form a gelatin sol, extruding the sol through a spinneret onto a rotating roller which has a surface wetted with a coagulating solution of divalent or trivalent metal salt and functions to elongate and tear off pieces of the sol, each piece having the shape of a shark fin with a thin streamlined profile in cross section, and washing the pieces with water.

9 Claims, 1 Drawing Sheet

PROCESS FOR PRODUCING A SHARK FIN ANALOG

This application is a continuation of now abandoned application Ser. No. 918,657, filed Oct. 14, 1986, which is a continuation of now abandoned application Ser. No. 814,180, filed Dec. 24, 1985, which is a continuation of now abandoned application Ser. No. 571,529, filed Jan. 17, 1984.

BACKGROUND OF THE INVENTION

This invention relates to a novel process and apparatus for producing a shark fin analog, i.e., a simulated food resembling a shark fin processed as a food.

Processed shark fins or ray fins have been cherished as an elegant food material for Chinese cuisine dishes such as soup. Particularly, with the recent trend in diet variety in foods, especially in elegant Chinese dishes, is widely sought after. Accordingly, the demand for shark fins is gradually increasing.

Shark fins practically utilized as the materials for soup or other dishes are processed products of muscle filaments existing between cartilage and skin of fins of shark or ray, having lengths, which may differ slightly depending on whether the product is a dried product or a frozen product, ranging on an average from about 50 to 100 mm. As to the thickness, the thickest portion is in the range from about 1.4 to 1.6 mm on an average. Shark fins generally have slender streamlined profiles in cross section, as shown in FIG. 3, with one end being thick and pointed at its tip, and other end extending slenderly as a tail. Of course, some fins are greater in size than those described above, and the fins with greater sizes are traded as higher class products. Further, shark fins have lustrous gold color or silver color and are highly valued as Kinshi (golden wings) or Ginshi (silver wings).

In ordinary cooking, Kinshi, etc. are produced from natural fins of shark or ray. A great number of process steps and much labor are required in production of these food products, such as repeated cycles of cooking under mild heating for a long time, removing bones and impurities, and immersing in water for several days. Also considerable experience and skill is necessary for successful cooking. Furthermore, depending on the conditions during production, only products of markedly inferior quality may sometimes be obtained. Thus, under the present circumstances, shark fins of high quality cannot be supplied in large amounts at low cost.

In view of the state of the art as described above, we have thought of producing a shark fin analog of high quality from gelatin. As is well known in the art, natural shark fins comprise primarily collagen, of which the amino acid composition is substantially equal to that of the collagen obtained from bones, skins or binding tissues of animals which are generally used as the starting materials for gelatin. On the other hand, the gelatin obtained from animal tissue collagen is today supplied and utilized widely as a product of stable quality at low cost in large amounts. Therefore, if the gelatin can be used as the starting material for production of a shark fin analog, it will become possible to supply food materials having flavor, nutritional values and other characteristics comparable to those of natural products at low cost.

In the prior art, it has been known to treat fibers of gelatin obtained by wet spinning of a neutral solution thereof with a hardening agent, followed by washing with water and drying, to produce an edible gelatin (Japanese Patent Publication No. 8615/1970). However, the edible gelatin prepared according to this method has proved to have a mouth-feel unlike that of shark fins and not satisfactory as compared with shark fins from natural resources. For example, it has low strength and cannot be formed to have a streamlined profile, and fabrication thereof into a shape similar to natural shark fins was impossible even when the gelatin concentration was decreased or increased. Besides, while sufficient resistance to hot water is necessary for use in a heated liquid such as soup, the edible gelatin obtained according to the prior art method becomes very soft when boiled in hot water, and even those subjected once to spinning fail to have a mouth-feel of shark fins. Further, because of the treatment with a hardening agent, the treated gelatin becomes hardened to exhibit a dry and crumbling feeling. There was also a drawback in the manufacturing steps including the drying step, in that a considerable amount of energy was consumed. Thus, the edible fibrous gelatin obtained according to the process of the prior art as described above has no satisfactory quality as an alternate for naturally produced shark fins and therefore could not be used satisfactorily as an elegant food material for Chinese dishes.

SUMMARY OF THE INVENTION

Accordingly, it is an object of the present invention to provide a process and an apparatus for producing a shark fin analog by using gelatin, which product has excellent quality comparable to that of natural processed shark fins, and which can be used satisfactorily as an elegant food material for Chinese dishes.

Thus, the present invention provides a process for producing a shark fin analog which comprises heating to dissolve a starting material mixture comprising (a) gelatin, (b) alginic acid or an alginate or a mannan, and (c) water, further containing, if necessary, one or more protein such as egg white, casein, vegetable protein and collagen, spinning, the resultant gelatin sol into a coagulation bath comprising a solution of a divalent or trivalent metal salt thereby to form a structure of a streamlined profile in cross section (hereinafter referred to as streamlined shape), washing the spun product with water, and removing water from the washed product.

The present invention also provides an apparatus for producing a shark fin analog, which apparatus comprises a spinning header and nozzle (hereinafter referred to as a spinneret) for discharging a gelatin sol dissolved by heating, an elongating and tearing-off roller which rotates under the spinneret and receives and elongates the gelatin sol discharged from said spinneret to tear off the sol spun into a streamlined shape, and a coagulation bath for coagulating the gelatin sol spun into the streamlined shape.

DETAILED DESCRIPTION OF THE INVENTION

Figure 1A:
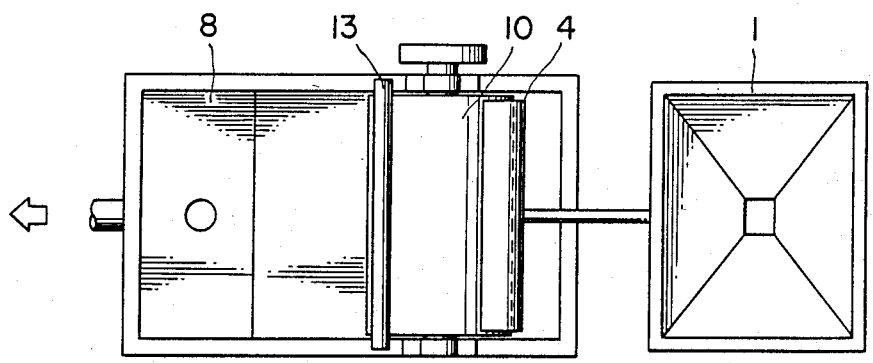
FIG. 1a and FIG. 1b are a plan view and a side elevational view, respectively, of an embodiment of the apparatus according to the present invention.

According to the present invention, in the first place, in addition to gelatin, alginic acid or an alginate or a mannan is added thereto and mixed together with water to provide a starting material mixture. By the addition of these other substances to gelatin, the product obtained can be made similar in both mouth-feel and appearance to natural shark fins. As the alginate, sodium alginate is preferable. As the mannan, not only mannan in a narrow sense but also the mannan in a broad sense, including galactomannan, glucomannan and konjak-mannan, may be used.

The amounts of the respective components are preferably 5 to 50% for and 1 to 10% for alginic acid, an alginate or a mannan, the balance being water, based on the weight of the starting material to which water has been added. At a level of gelatin less than 5%, the product obtained does not have the good mouth-feel is of shark fins and also poor in appearance. On the other hand, at a level higher than 50%, its spinning characteristic is lowered, and the mouth-feel becomes unsatisfactory. With the use of alginic acid, an alginate or a mannan in an amount less than 1%, no strong mouth-feel can be obtained, while an amount in excess of 10% will result in poor spinning characteristic and too strong and unfavorable mouth-feel.

Other than these components, it is also possible to add one or more proteins, such as egg white, casein, vegetable proteins and collagen, if desired. Their amount ranges from 1 to 10%, preferably from 1 to 5%, and the texture and the taste of the product can be improved by addition of these components. In any case, the mixture is mixed with addition of water at room temperature and left to stand for 1 to 2 hours to cause the materials to become swollen with water.

The starting material mixture containing gelatin thus obtained is then heated to the components. The heating temperature may be the dissolving temperature for gelatin or higher but is preferably in the range from 30° to 80° C. At a temperature lower than this range, the viscosity is increased excessively to impair the spinning characteristic, while a temperature higher than this range may also bring about deterioration of the gelatin, whereby the spinning characteristic will be impaired. For the sake of the viscosity after heating and the strength of the fibres formed, a temperature around 50° C. is preferred.

When the starting material mixture is dissolved by heating in this manner, or thereafter, it is preferable to perform degassing. Degassing will provide a product higher in quality with respect to both mouth-feel and appearance as compared with that obtained without degassing. As the method for degassing, degassing under reduced pressure may be conducted during dissolution or natural degassing may be conducted with addition of a defoaming agent during dissolution.

The gelatin sol obtained by heating to dissolve amply, preferably with degassing, is then extruded into a coagulating solution through a spinneret to be formed by spinning into a streamlined shape. The spinneret may have an aperture of about 0.5 to 5.0 mm in diameter, preferably about 1.0 to 3.0 mm, corresponding to the thickness of shark fin. As the coagulating solution, an aqueous solution of a divalent or trivalent metal salt is used. The divalent or trivalent metal salt is preferably a salt of calcium, magnesium, aluminum or iron. Among these salts, an aqueous solution of a salt of calcium or aluminum, for example, calcium chloride, calcium hydroxide, or aluminum sulfate, is preferable. While the concentration of the aqueous solution depends on the salt employed, a concentration of the order of 1 to 10% is preferred.

Figure 3:
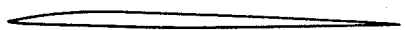
FIG. 3 is a sectional view showing a natural shark fin.

Various methods may be employed for discharging the gelatin sol through a spinneret into a coagulation bath to be formed by spinning into a streamlined shape, that is, a profile shape similar to that of natural processed shark fins as shown in FIG. 3. For example, while the coagulating solution is caused to flow at a constant speed of the order of 50 to 100 m/min. through a trough, the gelatin sol is discharged out into the stream. When the leading end of the fibrous gelatin sol formed contacts the coagulating solution, the fibrous gelatin is torn off by the flowing of the solution at a certain length and immersed as it is in the solution for 3 to 5 minutes, whereby the gelatin coagulates and is formed in a streamlined shape pointed narrowly at both ends of its profile. The formed product is taken out, washed thoroughly with water and freed of excess water, whereupon a shark fin analog is obtained. After washing with water, a calcium salt or an aluminum salt may be further added for hardening of the gelatin fibers.

Figure 1B:
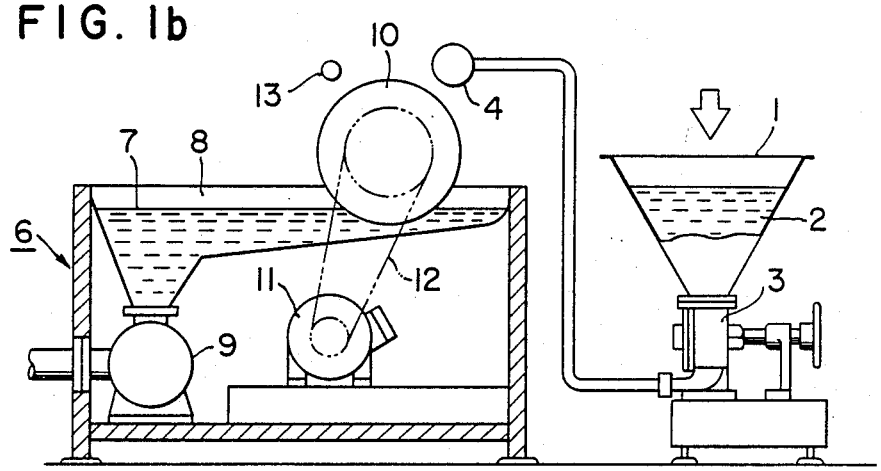
Figure 2:
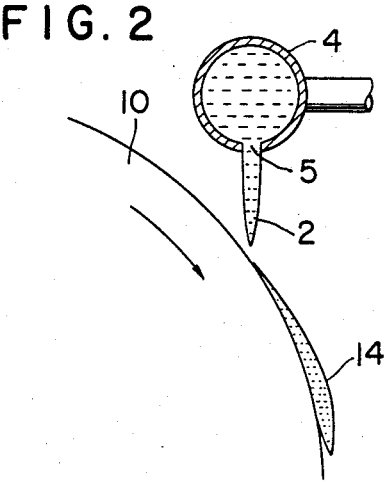
FIG. 2 is a schematic side elevation showing the state of the device shown in FIG. 1 during operation.

In the present invention, as another method for spinning and forming a gelatin sol dissolved by heating into a streamlined shape, it is possible to use a method in which the gelatin sol is discharged out through a spinneret onto a roller wetted on its surface with a coagulating solution and rotating at a constant speed, and is further immersed in said solution. The present invention also provides an apparatus for practicing this method. In one example of such an apparatus as shown in FIGS. 1 and 2, a hopper 1 is used for feeding the dissolved gelatin sol 2 obtained by heating the starting material mixture. The gelatin sol in the hopper 1 is delivered by a pump 3 to a spinneret 4. The spinneret 4 has one or more orifices of about 0.5 to 5.0 mm, preferably about 1.0 to 3.0 mm in diameterr as mentioned above.

Below the spinneret 4, there is provided a coagulating forming apparatus designated as a whole by reference numeral 6. The apparatus has a coagulation bath tank 8 provided at the upper portion thereof and filled with a coagulating solution 7. A pump 9 is provided at the lower part of the coagulation bath tank 8 for discharging and circulating the coagulating solution 7.

Between the coagulation bath tank 8 and the spinneret 4, a roller 10 having a certain diameter is rotatably supported and at its lower part is immersed in the coagulating solution 7. This roller 10 is rotated, via a belt 12 by a motor 11 provided below the coagulation bath tank 8 and the roller 10 rotates at a constant speed of the order of 100 to 200 rpm. A shower nozzle 13 with several orifices for spraying the coagulating solution is also suspended above the coagulation bath tank 8 so that the coagulating solution can be supplied by jetting through the nozzle 13 into the coagulation bath tank. In the example shown in the drawing, a part of the coagulating solution may be fed through the shower nozzle 13 directly onto the roller 10. In this case, the roller 10 is wetted on its surface with both the coagulating solution from the shower nozzle 13 and the coagulating solution in the coagulating bath tank 8. Of course, it is only required that the roller by amply wetted with the solution from either source. That is to say, if the roller 10 is positioned below the shower nozzle 13 so as to receive the coagulating solution therefrom, the lower part of the roller need not be immersed in the coagulating bath, and vice versa. Also, wetting of the roller 10 with the coagulating solution 7 is not necessarily required, provided that the material for the roller and other factors are so devised as to impart a peel-off characteristic to the roller.

In the operation of the apparatus of the above described construction, the dissolved gelatin sol 2 obtained by heating is delivered by the pump 3 from the hopper 1 to the spinneret 4 and is discharged through its orifice 5 onto the roller 10 rotating below. The gelatin sol 2 thus dropped on the surface of the roller 10 wetted with the coagulating solution as shown in FIG. 2 is drawn and elongated by the roller 10 rotating in the direction of the arrow and torn off at a certain length, whereby it is spun into a streamlined shape 14 with one end being thick and pointed at its leading tip, and the other end being slenderly extended as a tail. Thus, the roller 10 functions as an elongating and tearing-off roller. The gelatin sol torn off and formed into the streamlined shape falls into the coagulation bath 7 and is immersed therein for 3 to 5 minutes to be coagulated and is thereafter taken out by a convenient means from the coagulation bath tank 8. The coagulating solution 7 is taken out from the bottom of the tank 8, delivered again to the coagulating solution shower nozzle 13, and jetted through the nozzle into the tank 8 and/or onto the roller 10, thus being used under circulation. After the product is taken out, it is washed with water to obtain a shark fin analog. If necessary, the analog product may be treated with a hardening agent.

The product thus obtained has great strength and has a streamlined shape, its shape and appearance as well as lustre resembling those of natural shark fins. It also has excellent hot water resistance, is capable of maintaining its fibrous shape even when immersed in a hot liquid such as soup, and also has a good property of forming spun fibers. Of course, when eaten, it can give a mouth-feel and texture like those of natural shark fins and therefore it can be amply used as a material for elegant Chinese cuisine. Also, the apparatus according to the present invention is simple in structure and operation, and it was found to be effectively utilizable for elongating and tearing off the gelatin sol formed by spinning into a streamlined shape and coagulated.

In order to indicate more fully the nature and utility of this invention, the following Examples are set forth, it being understood that these Examples are presented as illustrative only and are not intended to limit the scope of the invention. Throughout these Examples, quantities expressed in parts are by weight.

EXAMPLE 1

With 20 parts of gelatin are mixed well 5 parts of sodium alginate, and 75 parts of water are added to the resultant mixture. After swelling at room temperature for 1 hour, the mixture was heated in a warm bath at 60° C. to thoroughly dissolve the gelatin. This step was followed by degassing under reduced pressure. The gelatin sol was discharged through a nozzle with an orifice of 1.5 mm into a trough through which a 5% calcium chloride solution was flowing. As soon as the leading tip of the gelatin fiber contacted the liquid surface, a certain length of the fiber was torn off by the flow of the liquid, to be formed into a streamlined gelatin fiber pointed thinly at both ends. The fiber was immersed as it was in the 5% calcium chloride solution for 3 to 5 minutes to be coagulated and then washed thoroughly with water to obtain a shark fin analog. By varying the flow velocity of the solution, the nozzle orifice and the nozzle position (height from the liquid surface), products having desired properties such as thickness, length and cutting strength as shown in Table 1 can be obtained.

TABLE 1

| Flow speed of coagulating solution | Nozzle orifice | Nozzle position | Properties of shark fin analog product | | |
|---|---|---|---|---|---|
| | | | Diameter at the thick portion *1 | *1 Length | *2 Strength |
| 50 m/min | 1.5 mm | 4 cm | 1.4 mm | 100 mm | 1180 g/g |
| 100 | 1.5 | 4 | 1.4 | 60 | 1160 |

*1: Average value of 100 fibers
*2: Strength is shown in terms of the strength measured by sampling 1 g of the shark fin analog product in a cell for measurement and cutting the sample with a piano wire plunger of a rheometer.

This product was cooked in a soup. With a natural shark fin as control, trial eating by 25 panel members was carried out. The results were as shown in Table 2. The product of this invention, as compared with the natural shark fin, exhibited no significant difference in mouth-feel, taste and appearance, at a statistical risk level of 5%.

TABLE 2

| | Mouth-feel | Taste | Appearance |
|---|---|---|---|
| Members who rated the natural product as better | 13 | 13 | 11 |
| Members who rated the product of the invention as better | 12 | 12 | 14 |

EXAMPLE 2

Thirty (30) parts of gelatin, 3 parts of mannan and 2 parts of milk casein were mixed and allowed to swell with 65 parts of water, and the swollen mixture was dissolved by heating at 45° C. and thereafter degassed. The resultant gelatin sol was discharged by means of the apparatus shown in FIG. 1 onto a roller rotating while being in contact with a 1% calcium hydroxide solution through a nozzle with an orifice of 2.0 mm. The gelatin fiber discharged through the nozzle was drawn by the roller simultaneously with contact with the roller and torn off while being elongated, dropping into the coagulation bath of the 1% calcium hydroxide solution. The gelatin fiber thus obtained was of streamlined shape with one end being thick and pointed at its tip, and the other end being slenderly extended as a tail. Depending on the rotating speed of the elongating roller, the nozzle orifice, the position of the nozzle relative to the roller (the nozzle height from the roller contact face), products having desired thicknesses, lengths and cutting strengths as shown in Table 3 can be obtained.

TABLE 3

| Rotating speed of elongating roller | Nozzle orifice | Nozzle position | Properties of shark fin analog product | | |
|---|---|---|---|---|---|
| | | | Diameter at the thick portion *1 | *1 Length | *2 Strength |
| 100 rpm | 1.5 mm | 4 cm | 1.8 mm | 90 mm | 960 g/g |
| 200 | 2.0 | 4 | 1.8 | 65 | 1020 |
| 100 | 1.5 | 4 | 1.4 | 85 | 840 |

TABLE 3-continued

| Rotating speed of elongating roller | Nozzle orifice | Nozzle position | Properties of shark fin analog product | | |
|---|---|---|---|---|---|
| | | | Diameter at the thick portion *1 | *1 Length | *2 Strength |
| 200 | 1.5 | 8 | 1.4 | 120 | 880 |

*1: Average value of 100 fibers
*2: Strength is shown in terms of the strength measured by sampling 1 g of the shark fin analog product in a cell for measurement and cutting the sample with a piano wire plunger of a rheometer.

This product was cooked in a soup, with a natural shark fin as control. The results of trial eating by 25 panel members are shown in Table 4 below. The product of this invention, as compared with the natural shark fin, exhibited no significant difference in mouth-feel, taste and appearance, at a statistical risk level of 5%.

TABLE 4

| | Mouth-feel | Taste | Appearance |
|---|---|---|---|
| Members who rated the natural product as better | 14 | 13 | 14 |
| Members who rated the product of the invention as better | 11 | 12 | 11 |

EXAMPLE 3

Forty (40) part of gelatin and 8 parts of sodium alginate were mixed well, and the mixture was allowed to swell with 52 parts of water at room temperature for 2 hours and then heated in a warm bath at 80° C. to amply dissolve the mixture to prepare a dissolved gelatin sol. The gelatin sol was discharged by means of the apparatus shown in FIG. 1 through a nozzle with an orifice of 1.5 mm onto a roller rotating while being contacted by a 3% aluminum sulfate solution. Following the same procedure as described in Example 2, a shark fin analog product was obtained. The analog product obtained was subjected to the panel test similarly as in Examples 1 and 2. As the result, there was no significant difference between the product of this invention and the natural product, at a statistical risk level of 5%.

What is claimed is:

1. A process for producing a shark fin analog, which comprises heating a starting material mixture comprising (a) 5–50% of gelatin, (b) 1–10% of alginic acid, an alginate or a mannan, and (c) water, based on the weight of the starting material mixture, to produce a gelatin sol, extruding the gelatin sol through a spinneret having an orifice of approximately 0.5 to 5.0 mm in diameter, dropping the extruded sol onto a descending portion of a surface of a roller rotating at a rotation speed of 100 to 200 rpm and wetted with a coagulating solution comprising a divalent or trivalent metal salt, thereby to elongate and tear off the sol under rotational action of said roller and form the sol into a piece of a streamlined profile in cross-section with one end being relatively thick and pointed at its leading tip and the other end being relatively slenderly extended as a tail, further immersing the sol in the coagulating solution, and wasing the resultant product with water.

2. A process according to claim 1, wherein the starting material mixture further contains a protein in addition to the gelatin.

3. A process according to claim 2, wherein the additional protein is one or more members selected from the group consisting of egg white, casein, vegetable proteins and collagen.

4. A process according to claim 3, wherein the additional protein is contained in an amount of 1 to 10% by weight of the starting material mixture.

5. A process according to claim 2, wherein the additional protein is contained in an amount of 1 to 10% by weight of the starting material mixture.

6. A process according to claim 1, wherein the starting material mixture is heated at a temperature in the range from 30° to 80° C.

7. A process according to claim 1, wherein the divalent or trivalent metal salt is one or more salts of metals selected from the group consisting of calcium, magnesium, aluminum and iron.

8. A process according to claim 1, wherein the divalent or trivalent metal salt is one or more members selected from the group consisting of calcium chloride, calcium hydroxide and aluminum sulfate.

9. A process according to claim 1, wherein the spinneret has an orifice of about 1.0 to 3.0 mm in diameter.

* * * * *